United States Patent
Higashi

(10) Patent No.: US 11,536,169 B2
(45) Date of Patent: Dec. 27, 2022

(54) CONTROLLER AND CONTROL METHOD FOR VEHICLE

(71) Applicant: TOYOTA JIDOSHA KABUSHIKI KAISHA, Toyota (JP)

(72) Inventor: Takahiro Higashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/482,878

(22) Filed: Sep. 23, 2021

(65) Prior Publication Data

US 2022/0099005 A1 Mar. 31, 2022

(30) Foreign Application Priority Data

Sep. 30, 2020 (JP) .............................. JP2020-165341

(51) Int. Cl.
  *F01M 1/18* (2006.01)
  *F01M 1/06* (2006.01)
  *F01M 9/10* (2006.01)
  *G07C 5/08* (2006.01)

(52) U.S. Cl.
  CPC ............. *F01M 1/18* (2013.01); *F01M 1/06* (2013.01); *F01M 9/10* (2013.01); *G07C 5/0816* (2013.01); *F01M 2250/60* (2013.01)

(58) Field of Classification Search
  CPC .. F01M 1/18; F01M 1/06; F01M 9/10; F01M 2250/60; G07C 5/0816; F02D 41/06; F02M 69/00
  See application file for complete search history.

(56) References Cited

U.S. PATENT DOCUMENTS

| | | | | |
|---|---|---|---|---|
| 5,626,108 A | * | 5/1997 | Kato | .................... F02D 13/0215 |
| | | | | 123/90.15 |
| 2008/0109129 A1 | * | 5/2008 | Yanagida | .................. B60K 6/26 |
| | | | | 184/104.1 |
| 2010/0026306 A1 | | 2/2010 | Zhang et al. | |
| 2013/0291835 A1 | * | 11/2013 | Imamura | ............... F02N 19/004 |
| | | | | 123/445 |

FOREIGN PATENT DOCUMENTS

| | | |
|---|---|---|
| DE | 10 2014 220 690 A1 | 4/2015 |
| JP | 2006-207457 A | 8/2006 |
| JP | 2013-75537 A | 4/2013 |
| WO | WO 90/04188 A1 | 4/1990 |
| WO | WO-2015186957 A1 * 12/2015 ............. F01M 11/10 |
| WO | WO 2020/120514 A1 | 6/2020 |

* cited by examiner

*Primary Examiner* — Syed O Hasan
(74) *Attorney, Agent, or Firm* — Oblon, McClelland, Maier & Neustadt, L.L.P.

(57) ABSTRACT

A controller for a vehicle that includes an internal combustion includes processing circuitry. The processing circuitry obtains a predicted temperature outside the vehicle and estimates the viscosity of a lubricating oil based on the oil pressure and the oil temperature of the lubricating oil when the internal combustion engine satisfies a specific operation condition. When the processing circuitry determines that there is a likelihood of a cranking failure occurring in the internal combustion engine on condition that the predicted temperature is less than a threshold value that is based on the viscosity, the processing circuitry outputs a notification signal indicating that that there is a likelihood of a cranking failure occurring in the internal combustion engine.

7 Claims, 2 Drawing Sheets

CONTROLLER AND CONTROL METHOD FOR VEHICLE

BACKGROUND

1. Field

The following description relates to a controller and a control method for a vehicle.

2. Description of Related Art

Japanese Laid-Open Patent Publication No. 2013-075537 discloses a vehicle including an internal combustion engine. The vehicle also includes a vehicle controller. The controller obtains the present ambient temperature and a non-running period during which the internal combustion engine has been stopped. The controller uses the present ambient temperature and the non-running period to determine whether there is a likelihood of a cranking failure occurring in the internal combustion engine.

The controller described in the above publication determines the likelihood of a cranking failure occurring when cranking the internal combustion engine. However, if a cranking failure of the internal combustion engine could be predicted ahead of time, this would allow precautionary measures to be taken.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a vehicle that includes an internal combustion engine is provided. The controller includes processing circuitry configured to execute a temperature acquisition process that obtains a predicted temperature outside the vehicle, a viscosity estimation process that estimates viscosity of a lubricating oil based on an oil pressure and an oil temperature of the lubricating oil when the internal combustion engine satisfies a specific operation condition, in which the lubricating oil is supplied to the internal combustion engine to lubricate the internal combustion engine, a cranking determination process that determines that there is a likelihood of a cranking failure occurring in the internal combustion engine on condition that the predicted temperature obtained in the temperature acquisition process is less than a threshold value that is based on the viscosity, and a notification process that outputs a notification signal indicating that that there is a likelihood of a cranking failure occurring in the internal combustion engine when the cranking determination process determines that there is a likelihood of a cranking failure occurring in the internal combustion engine.

In another general aspect, a method for controlling a vehicle that includes an internal combustion engine is provided. The method includes storing an oil pressure of a lubricating oil for the internal combustion engine as a specified oil pressure when the internal combustion engine satisfies a specific operation condition, storing an oil temperature of the lubricating oil as a specified oil temperature when the internal combustion engine satisfies the specific operation condition, estimating a specified viscosity of the lubricating oil based on the specified oil pressure and the specified oil temperature, correcting the specified viscosity based on a traveled distance of the vehicle from when the lubricating oil is changed, setting a threshold value based on the specified viscosity that has been corrected, obtaining a predicted temperature outside the vehicle, determining that there is a likelihood of a cranking failure occurring in the internal combustion engine when the predicted temperature is less than the set threshold value, and outputting a notification signal indicating a likelihood of a cranking failure occurring in the internal combustion engine when determined that there is a likelihood of a cranking failure occurring in the internal combustion engine.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

One embodiment of the present disclosure will now be described below. First, a schematic configuration of a vehicle 500 to which a controller of the present disclosure is applied will be described.

Figure 1:
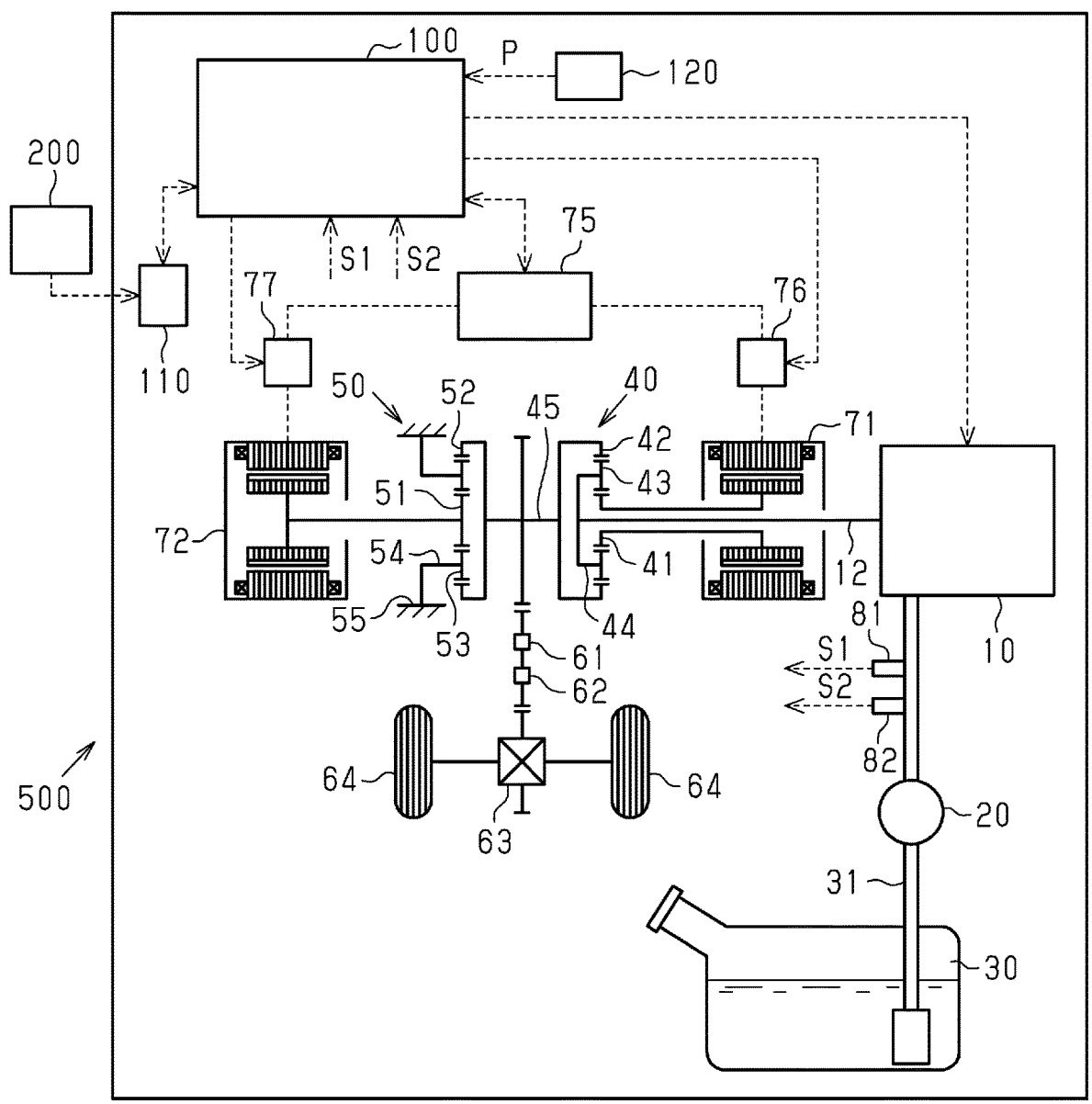
FIG. 1 is a schematic diagram of a vehicle.

As shown in FIG. 1, the vehicle 500 includes an internal combustion engine 10, a first motor generator 71, and a second motor generator 72 that serve as drive sources. The first motor generator 71 and the second motor generator 72 each has the functionality of an electric motor and a generator. The vehicle 500 is a hybrid vehicle.

The internal combustion engine 10 includes an output shaft 12. The output shaft 12 is connected to the pistons (not shown) of the internal combustion engine 10. The reciprocating motion of the pistons rotates the output shaft 12. That is, the output shaft 12 is rotated by the internal combustion engine 10, which functions as a drive source.

The vehicle 500 includes a first planetary gear mechanism 40, a ring gear shaft 45, a second planetary gear mechanism 50, an automatic transmission 61, a speed reduction mechanism 62, a differential mechanism 63, and two drive wheels 64 that form a transmission path of driving force.

The first planetary gear mechanism 40 includes a sun gear 41, a ring gear 42, multiple pinion gears 43, and a carrier 44.

The sun gear 41 is an external gear. The ring gear 42 is an internal gear arranged outward from the sun gear 41. The ring gear 42 is rotatable relative to the sun gear 41 and coaxial with the sun gear 41. The pinion gears 43 are arranged between the sun gear 41 and the ring gear 42. The pinion gears 43 are each meshed with the sun gear 41 and the ring gear 42. The pinion gears 43 are connected to the carrier 44. The carrier 44 supports the pinion gears 43 so that the pinion gears 43 can freely rotate and orbit.

In the first planetary gear mechanism 40, the carrier 44 is connected to the output shaft 12. The sun gear 41 is connected to the first motor generator 71. The ring gear 42 is connected to the ring gear shaft 45.

The ring gear shaft 45 is connected to the automatic transmission 61. The automatic transmission 61 is a multi-gear transmission configured to shift the gear ratio in stages with multiple planetary gear mechanisms (not shown). The automatic transmission 61 is connected to the right and left drive wheels 64 via the speed reduction mechanism 62 and the differential mechanism 63. The torque received from the automatic transmission 61 is reduced in speed by the speed reduction mechanism 62 at a predetermined speed reduction ratio and output. The differential mechanism 63 allows for a difference in the rotation speeds of the right and left drive wheels 64.

The second planetary gear mechanism 50 includes a sun gear 51, a ring gear 52, multiple pinion gears 53, a carrier 54, and a case 55. The sun gear 51 is an external gear. The ring gear 52 is an internal gear arranged outward from the sun gear 51. The ring gear 52 is rotatable relative to the sun gear 51 and coaxial with the sun gear 51. The pinion gears 53 are arranged between the sun gear 51 and the ring gear 52. The pinion gears 53 are each meshed with the sun gear 51 and the ring gear 52. The pinion gears 53 are connected to the carrier 54. The carrier 54 supports the pinion gears 53 so that the pinion gears 53 freely rotate. The carrier 54 is fixed to the case 55. Accordingly, the carrier 54 supports the pinion gears 53 so that the pinion gears 53 do not orbit.

In the second planetary gear mechanism 50, the sun gear 51 is connected to the second motor generator 72. The ring gear 52 is connected to the ring gear shaft 45. Accordingly, the ring gear 52 is connected to the right and left drive wheels 64 via the ring gear shaft 45, the speed reduction mechanism 62, and the differential mechanism 63.

The vehicle 500 includes a battery 75, a first inverter 76, and a second inverter 77 that transfer electric power. When the first motor generator 71 and the second motor generator 72 function as generators, the battery 75 stores the power generated by the first motor generator 71 and the second motor generator 72. When the first motor generator 71 and the second motor generator 72 function as electric motors, the battery 75 supplies power to the first motor generator 71 and the second motor generator 72.

The first inverter 76 regulates the amount of power transferred between the first motor generator 71 and the battery 75. The second inverter 77 regulates the amount of power transferred between the second motor generator 72 and the battery 75.

The vehicle 500 includes an oil pan 30, an oil passage 31, and an oil pump 20 that form a hydraulic circuit. The oil pan 30 stores a lubricating oil that lubricates the internal combustion engine 10. The oil pan 30 is connected to the internal combustion engine 10 via the oil passage 31. The oil pump 20 is arranged in the oil passage 31. The oil pump 20 draws the lubricating oil from the oil pan 30 and supplies the lubricating oil to the internal combustion engine 10.

The vehicle 500 includes an oil pressure sensor 81 and an oil temperature sensor 82. The oil pressure sensor 81 is located between the oil pump 20 and the internal combustion engine 10 in the oil passage 31. The oil pressure sensor 81 detects the oil pressure of the lubricating oil in the oil passage 31 and outputs a detection signal S1 indicating the oil pressure.

The oil temperature sensor 82 is located between the oil pump 20 and the internal combustion engine 10 in the oil passage 31. The oil temperature sensor 82 detects the oil temperature of the lubricating oil in the oil passage 31 and outputs a detection signal S2 indicating the oil temperature.

The vehicle 500 includes an ECU 100. The ECU 100 obtains a detection signal S1 from the oil pressure sensor 81 and a detection signal S2 from the oil temperature sensor 82. The ECU 100 stores the oil pressure, which is indicated by the detection signal S1, taken when the internal combustion engine 10 satisfies specific operation conditions as a specified oil pressure RP. The ECU 100 also stores the oil temperature, which is indicated by the detection signal S2, taken when the internal combustion engine 10 satisfies the specific operation conditions as a specified oil temperature RT. The specific operation conditions include the condition in which the oil temperature is 80 degrees Celsius or greater and the condition in which the rotation speed of the output shaft 12 is an idle rotation speed, which indicates that the internal combustion engine 10 is in an idle state. The idle rotation speed may be 1000 rpm. In the present embodiment, the ECU 100 is a controller applied to the vehicle 500 including the internal combustion engine 10.

The relationship of the viscosity of a lubricating oil with respect to the temperature and oil pressure of the lubricating oil will now be described.

Figure 3:
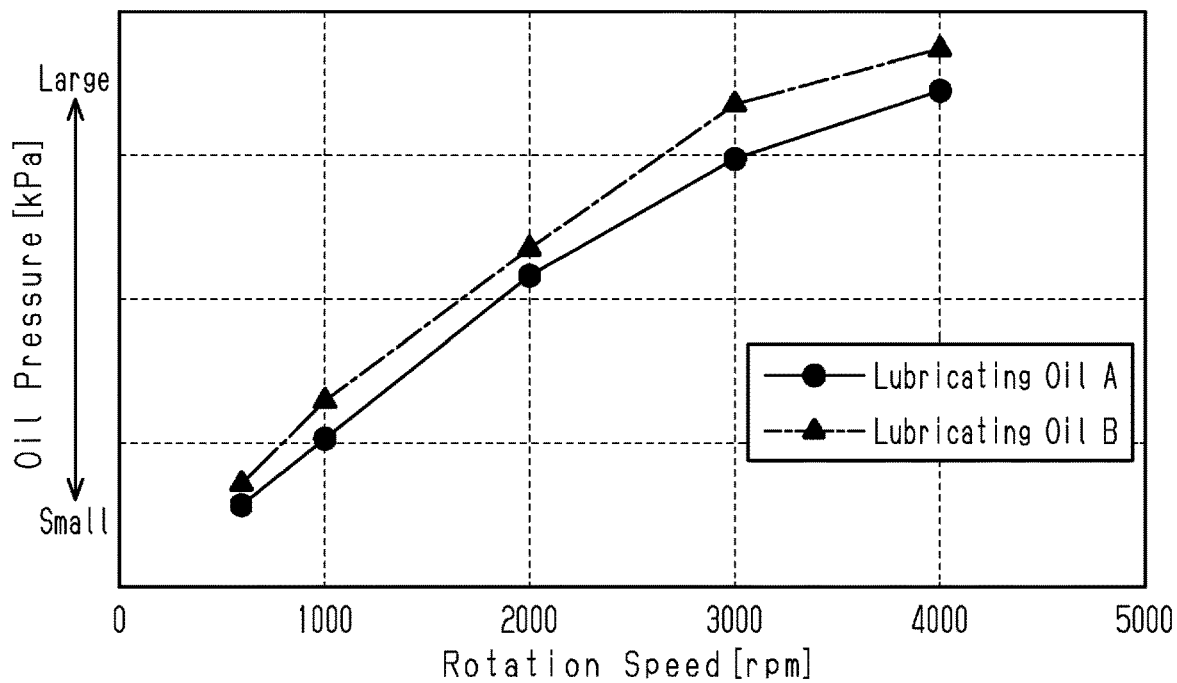
FIG. 3 is a graph showing how the oil pressure changes in different lubricating oils.

The graph in FIG. 3 illustrates the relationship between the rotation speed of the output shaft 12 and the oil pressure of a lubricating oil when the oil temperature of the lubricating oil is a specific temperature. This example illustrates the relationship between the rotation speed of the output shaft 12 and the oil pressure of lubricating oil A and lubricating oil B that have different viscosities. In this example, lubricating oil B has a greater viscosity than lubricating oil A. As shown in FIG. 3, the oil pressure increases as the rotation speed of the output shaft 12 increases when the oil temperature is the same. Thus, the lubricating oil type, namely, lubricating oil B having a relatively high viscosity or lubricating oil A having a relatively low viscosity can be specified from the oil pressure corresponding to a given temperature and a given rotation speed.

The ECU 100 includes viscosity presumption maps, which are based on the properties of the above lubricating oils. The viscosity presumption maps each show the relationship of the oil pressure and lubricating oil viscosity with respect to the oil temperature and the rotation speed of the output shaft 12 when the internal combustion engine 10 satisfies the specific operation conditions. In the present embodiment, the viscosity presumption maps each indicate the oil pressure of lubricating oils having different viscosities in correspondence with the oil temperature and the rotation speed of the output shaft 12 when the internal combustion engine 10 satisfies the specific operation conditions. The ECU 100 stores the viscosity presumption maps for every 10 degrees in the range from 80 degrees Celsius to 120 degrees Celsius.

The ECU 100 uses the viscosity presumption map for each temperature to estimate a specified viscosity RV. Specifically, when estimating the specified viscosity RV, the ECU 100 selects one of the viscosity presumption maps including the specified oil temperature RT. Then, the ECU 100 determines from the selected map that the lubricating oil with the oil pressure that is closest to the specified oil pressure RP is the lubricating oil stored in the oil pan 30. The ECU 100 presumes, or determines, that the viscosity of the determined lubricating oil is the specified viscosity RV of the lubricating oil stored in the oil pan 30. That is, the ECU 100 identifies the lubricating oil type to presume, or determine, that the viscosity is the specified viscosity RV.

The ECU 100 may be configured as processing circuitry including one or more processors that execute various types of processes according to a computer program (software). The ECU 100 may also be configured as circuitry including one or more dedicated hardware circuits such as application specific integrated circuits (ASIC) that execute at least part of various types of processes or a combination thereof. The processor includes a CPU and memory such as RAM and ROM. The memory stores program codes or instructions configured to cause the CPU to execute processes. The memory, or computer readable media, include any type of media that are accessible by general-purpose computers and dedicated computers.

The vehicle 500 includes a communication device 110 capable of performing communication with an external device 200 located outside the vehicle 500. The communication device 110 includes an operation unit for executing a communication process, an antenna for transmitting and receiving signals, and other peripheral circuitry (not shown). The communication device 110 is connected to the ECU 100 via a communication cable. That is, the ECU 100 obtains various types of data through the communication device 110.

The communication device 110 is configured to perform wireless communication with the external device 200. The external device 200 stores future temperature data. In the embodiment, the external device 200 stores meteorological data for the upcoming months. In the meteorological data, date and time is associated with the predicted temperature for that date and time. The meteorological data is generated for different regions such as for cities, states, and provinces as determined in advance.

The vehicle 500 includes a GPS receiver 120. The GPS receiver 120 receives a signal P indicating the coordinates of the current location of the vehicle 500 from GPS satellites. The ECU 100 obtains the signal P received by the GPS receiver 120 to obtain the coordinates indicating the current location of the vehicle 500.

The series of control executed by the ECU 100 to perform a notification process will now be described. In the series of control executed to perform the notification process, when the ECU 100 determines that there is a likelihood that a cranking failure of the internal combustion engine 10 may occur, the ECU 100 outputs a notification signal indicating such a cranking failure likelihood of the internal combustion engine 10. The series of control of the notification process is executed one time whenever the vehicle 500 enters a system-off state.

Figure 2:
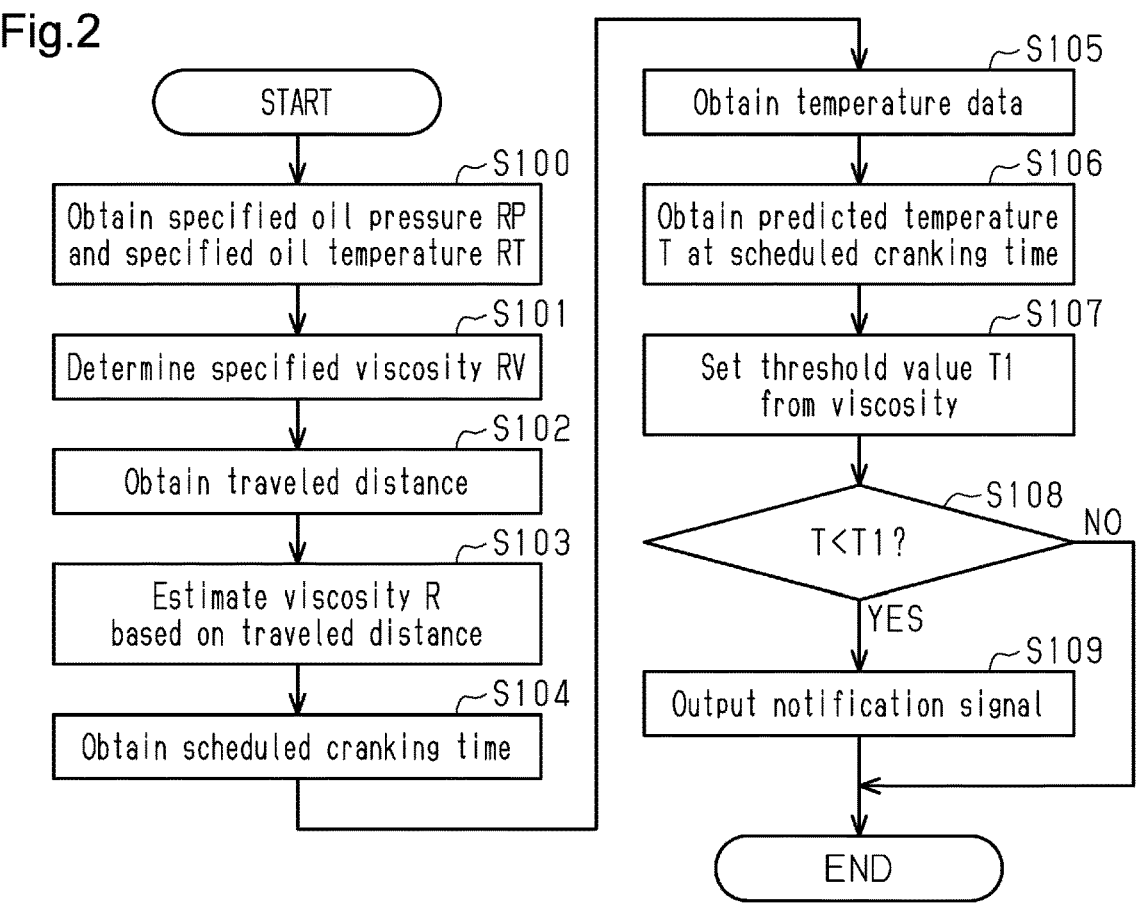
FIG. 2 is a flowchart of a control executed by an ECU.

As shown in FIG. 2, the ECU 100 executes step S100 when starting the notification process. In step S100, the ECU 100 obtains the latest stored values of the specified oil temperature RT and the specified oil pressure RP. The ECU 100 then proceeds to step S101.

In step S101, the ECU 100 determines the specified viscosity RV of the lubricating oil. As discussed above, the ECU 100 determines the specified viscosity RV using the viscosity presumption map corresponding to the temperature. After determining the specified viscosity RV, the ECU 100 proceeds to step S102.

In step S102, the ECU 100 obtains the traveled distance of the vehicle 500 from when the lubricating oil was changed. The ECU 100 stores a record of when the lubricating oil was changed. The ECU 100 obtains the traveled distance of the vehicle 500 calculated from detection signals of a speed sensor or the like (not shown). After obtaining the traveled distance, the ECU 100 proceeds to step S103.

In step S103, the ECU 100 estimates a lubricating oil viscosity R based on the traveled distance of the vehicle 500. Specifically, in step S103, the ECU 100 estimates a greater lubricating oil viscosity R as the traveled distance of the vehicle 500, from when the lubricating oil was changed, increases. For example, the ECU 100 increases the estimated viscosity R by a fixed value from the specified viscosity RV in increments of 100 kilometers. In other words, the ECU 100 estimates the viscosity R by correcting the specified viscosity RV. The ECU 100 then proceeds to step S104. In the present embodiment, step S103 serves as a viscosity estimation process that estimates the lubricating oil viscosity R.

In step S104, the ECU 100 obtains a scheduled cranking time of when the internal combustion engine 10 will be cranked next. The scheduled cranking time is input by a user of the vehicle 500 in advance to an input device or the like of the vehicle 500. After obtaining the scheduled cranking time, the ECU 100 proceeds to step S105. Step S104 serves as a time acquisition process that obtains a scheduled cranking time of when the internal combustion engine 10 will be cranked next.

In step S105, the ECU 100 obtains a predicted temperature outside the vehicle 500 at the scheduled cranking time. Specifically, the ECU 100 obtains a signal P from the GPS receiver 120 to obtain the coordinates of the current location. The ECU 100 associates the obtained coordinates of the current location with the scheduled cranking time and requests the external device 200 to transmit temperature data through the communication device 110. The external device 200 receives the transmission request and identifies the region including the coordinates of the current location. The external device 200 refers to the meteorological data of the identified region and obtains the temperature at the scheduled cranking time. The external device 200 transmits the temperature at the scheduled cranking time as temperature data to the ECU 100 through the communication device 110. The ECU 100 receives the temperature data transmitted from the external device 200. The ECU 100 then proceeds to step S106. Step S105 serves as a data acquisition process in which the ECU 100 obtains the temperature data for the future temperature outside the vehicle 500.

In step S106, the ECU 100 obtains a predicted temperature T at the scheduled cranking time based on the temperature data at the scheduled cranking time obtained in step S104. In the present embodiment, the ECU 100 obtains the predicted temperature T directly from the temperature data obtained in step S105. The ECU 100 then proceeds to step S107. Step S106 serves as a temperature acquisition process that obtains the predicted temperature T.

In step S107, the ECU 100 sets a threshold value T1 for the temperature. The threshold value T1 is set to determine whether there is a likelihood of a cranking failure occurring in the internal combustion engine 10 due to a high lubricating oil viscosity R. In this embodiment, the ECU 100 increases the threshold value T1 as the lubricating oil viscosity R, which is estimated in step S103, increases. For example, the ECU 100 may increase the threshold value T1 in proportion to the viscosity R. After setting the threshold value T1, the ECU 100 proceeds to step S108. Step S107 serves as a threshold value setting process that sets the threshold value T1.

In step S108, the ECU 100 determines whether the predicted temperature T obtained in step S106 is less than the threshold value T1. When the predicted temperature T is greater than or equal to the threshold value T1 (S108: NO), the ECU 100 ends processing. When the predicted temperature T is less than the threshold value T1 (S108: YES), the ECU 100 proceeds to step S109. Step S108 serves as a cranking determination process that there is a likelihood of a cranking failure occurring in the internal combustion engine 10.

In step S109, the ECU 100 outputs a notification signal indicating the likelihood of a cranking failure occurring in the internal combustion engine 10. Specifically, the ECU 100 outputs a notification signal to a display (not shown) in the vehicle 500 to show a message indicating that a cranking failure may occur in the internal combustion engine 10. After outputting the notification signal, the process of the ECU 100 ends. Step S109 serves as a notification process that outputs a notification signal for notification of a cranking failure of the internal combustion engine 10 when the ECU 100 determines in the cranking determination process the likelihood of the occurrence of a cranking failure in the internal combustion engine 10.

The operation of the present embodiment will now be described.

As the traveled distance of the vehicle 500 increases, in other words, as the period during which a lubricating oil is used becomes longer, more impurities will be included in the lubricating oil and oxidization will advance in the lubricating oil. Thus, an increase in the traveled distance will increase the probability of the lubricating oil viscosity being high.

When the temperature is exceptionally low, the lubricating oil viscosity will be high. Thus, the resistance of the lubricating oil passing through the oil passage 31 will increase. When the resistance of the lubricating oil increases, cranking of the internal combustion engine 10 becomes difficult. Further, when the vehicle 500 uses high-viscosity fluid, the possibility of a cranking failure occurring in the internal combustion engine 10 will increase.

The advantages of the present embodiment will now be described.

(1) In the present embodiment, when there is a likelihood of a cranking failure occurring in the internal combustion engine 10, the ECU 100 outputs a notification signal indicating such a cranking failure likelihood. This allows the user to predict the occurrence of a cranking failure by visually checking a displayed message based on the notification signal. Further, the user can take precautionary measures to avoid such a cranking failure of the internal combustion engine 10 by moving the vehicle 500 into a garage where the temperature will not be that low.

(2) In the present embodiment, the ECU 100 determines the probability of a cranking failure occurring at a scheduled cranking time input by the user in advance. This allows the ECU 100 to determine the likelihood of a cranking failure occurring in the internal combustion engine 10 at the time at which the internal combustion engine 10 is likely to be cranked.

(3) In the present embodiment, the threshold value T1 is set in accordance with the type of lubricating oil or the like supplied to the internal combustion engine 10. That is, the threshold value T1 is set in accordance with the lubricating oil viscosity R. Specifically, the threshold value T1 is set to a greater value as the viscosity estimated in the viscosity estimation process increases. The determination of the likelihood of a cranking failure occurring is more accurate based on the type of lubricating oil or the like.

(4) In the present embodiment, the threshold value T1 is set taking into consideration the lubricating oil viscosity that increases as the traveled distance of the vehicle 500 increases. The determination of the likelihood of a cranking failure occurring in the internal combustion engine 10 is more accurate based on the traveled distance of the vehicle 500.

(5) In the present embodiment, the data acquisition process obtains temperature data from the external device 200. This takes into consideration temperature changes and thereby increases accuracy when estimating the cranking capability of the internal combustion engine. Temperature data is obtained from the external device 200 located outside the vehicle 500. Thus, there is no need for the vehicle 500 to include a device or the like that obtains an accurately predicted temperature T. The predicted temperature T is estimated from the temperature data without requiring the user or the like to input the predicted temperature T.

The present embodiment may be modified as described below. The present embodiment and the following modifications can be combined as long as the combined modifications remain technically consistent with each other.

The vehicle 500 is not limited to the example in the above embodiment. For example, the drive source of the vehicle 500 may include only the internal combustion engine 10 and the first motor generator 71 and the second motor generator 72 may be omitted.

In the above embodiment, the condition for storing the specified oil pressure RP and the specified oil temperature RT does not have to be the internal combustion engine 10 being in a predetermined operation state. The internal combustion engine 10 does not need to satisfy the conditions for the oil temperature and the rotation speed of the output shaft 12 in the above embodiment as long as a lubricating oil is used under appropriate conditions while the internal combustion engine 10 is in operation. In order to estimate the viscosity of a lubricating oil for every range of in the predetermined operation state of the internal combustion engine 10, a viscosity presumption map needs to be prepared for every certain range of the rotation speed of the output shaft 12 and every certain temperature range of the lubricating oil.

The condition for starting the series of control of the notification process may differ from the example described in the above embodiment. For example, the user of the vehicle 500 may start the series of control of the notification process by inputting an instruction to a communication device capable of performing communication with the ECU 100, such as a smartphone. The above control is executed when the vehicle 500 enters a system-off state in the above embodiment. Instead, the control may be performed when the vehicle 500 is in a system-on state. Specifically, the above series of control may be started on condition that the internal combustion engine 10 has been stopped for a fixed time when the vehicle 500 is traveling using the first motor generator 71 as a drive source to travel.

In the above embodiment, the predicted temperature T does not need to be estimated from the temperature data at the scheduled cranking time. For example, the ECU 100 may obtain temperature data corresponding to the coordinates of the current location of the vehicle 500 for several upcoming days and set the predicted temperature T to the average temperature of the temperature data, the minimum temperature of the temperature data, or the like. Alternatively, instead of using the future temperature data, the ECU 100 may set the predicted temperature T to the average temperature of temperature data taken in the past during a fixed period, the minimum temperature of the temperature data taken in the past during the fixed period, or the like. In addition, the ECU 100 may set the predicted temperature T to a temperature input by the user.

In the above embodiment, the ECU 100 may estimate the scheduled cranking time. For example, a cranking time of the internal combustion engine 10 in the past over a fixed period may be stored so that the ECU 100 estimates a scheduled cranking time based on the stored cranking time.

The estimation of the specified viscosity RV is not limited to the example in the above embodiment. For example, the specified viscosity RV may be estimated based on only the specified oil pressure RP obtained by the oil pressure sensor 81 at a specified oil temperature RT obtained by the oil temperature sensor 82. Further, the specified viscosity RV may be a fixed value when the vehicle 500 uses a specific type of lubricating oil or the viscosity does not vary among the different types of lubricating oils that are expected to be used.

In the above embodiment, the viscosity estimation process may estimate the viscosity R based on a parameter other than the traveled distance. The estimated lubricating oil viscosity R may increase as the time from when the lubricating oil is changed becomes longer.

In the above embodiment, the viscosity estimation process does not need to estimate viscosity taking into consideration the traveled distance of the vehicle 500 and the like. That is, a specified viscosity RV may be directly used when estimating the lubricating oil viscosity R.

In the above embodiment, the external device 200 may transmit meteorological data corresponding to the coordinates of the current location as temperature data. In this case, the ECU 100 obtains the temperature for a scheduled cranking time based on the meteorological data as temperature data and obtains the identified temperature as the predicted temperature T.

In the above embodiment, the temperature obtained in the temperature acquisition process does not need to be limited to the example in the above embodiment. For example, the vehicle 500 may include a temperature sensor that measures the temperature of the vehicle 500 and obtain the temperature from the temperature sensor. In this case, the temperature sensor measures the temperature for a fixed period and outputs the temperature data to the ECU 100. The ECU 100 obtains the predicted temperature T at a scheduled cranking time based on changes in the temperature. This allows the predicted temperature T to be obtained based on a change in temperature in the past over a fixed period and ensures the accuracy of the predicted temperature T. The predicted temperature T is obtained from the temperature obtained by the temperature sensor without requiring the user or the like to input the predicted temperature T.

In the above embodiment, the temperature acquisition process may estimate a temperature from the temperature data taking into consideration another parameter. For example, weather data may be obtained together with the temperature data from the external device 200 and the predicted temperature T may be lower than the value of the temperature data when rain is forecasted at a scheduled cranking time.

Temperature data does not need to be used to obtain the predicted temperature T. For example, the user of the vehicle 500 may input the predicted temperature T.

In the above embodiment, the lubricating oil viscosity R and a threshold value T1 do not need to have a proportional relationship. For example, the threshold value T1 may increase in steps as the viscosity R increases. In other words, the viscosity R and the threshold value T1 may have any relationship as long as the threshold value T1 is set based on the viscosity R estimated in step S103 in the above embodiment.

In the above embodiment, the likelihood of a cranking failure occurring in the internal combustion engine 10 may be notified in any manner. For example, a notification may be issued by illuminating an indicator lamp or generating a warning sound.

In the above embodiment, the ECU 100 may output a signal for displaying an additional message together with a notification signal for displaying a message that there is a likelihood of a cranking failure occurring in the internal combustion engine 10. Examples of the additional message include a message that prompts a user to change the lubricating oil to one having a lower viscosity and a message that prompts the user to move the vehicle 500 into a garage or the like where changes in the temperature are small.

In the above embodiment, a notification signal does not need to be output to a display in the vehicle 500. A notification signal may be output to a smartphone or the like that is carried by the user so that a message or the like is displayed on the smartphone.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a vehicle that includes an internal combustion engine, the controller comprising:
processing circuitry configured to execute
a temperature acquisition process that obtains a predicted temperature outside the vehicle,
a viscosity estimation process that estimates viscosity of a lubricating oil based on an oil pressure and an oil temperature of the lubricating oil when the internal combustion engine satisfies a specific operation condition, wherein the lubricating oil is supplied to the internal combustion engine to lubricate the internal combustion engine,
a cranking determination process that determines that there is a likelihood of a cranking failure occurring in the internal combustion engine on condition that the predicted temperature obtained in the temperature acquisition process is less than a threshold value that is based on the viscosity, and
a notification process that outputs a notification signal indicating that that there is a likelihood of a cranking failure occurring in the internal combustion engine when the cranking determination process determines that there is a likelihood of a cranking failure occurring in the internal combustion engine.

2. The controller according to claim 1, wherein
the processing circuitry is configured to execute a time acquisition process that obtains a scheduled cranking time at which the internal combustion engine will be cranked next, and
the processing circuitry is configured to obtain a temperature outside the vehicle at the scheduled cranking time, which is obtained in the time acquisition process, as the predicted temperature in the temperature acquisition process.

3. The controller according to claim 2, wherein
the vehicle includes a communication device capable of performing communication with an external device that is located outside the vehicle,
the processing circuitry is configured to execute a data acquisition process that obtains temperature data of a future temperature outside the vehicle through the communication device, and
the processing circuitry is configured to obtain the predicted temperature in the temperature acquisition process by obtaining the predicted temperature at the scheduled cranking time from the temperature data, which is obtained in the data acquisition process.

4. The controller according to claim 2, wherein
the vehicle includes a temperature sensor configured to measure a temperature outside the vehicle, and
the processing circuitry is configured to obtain the predicted temperature in the temperature acquisition process by obtaining the predicted temperature at the scheduled cranking time based on a change in the temperature in the past over a fixed period, which is obtained by the temperature sensor.

5. The controller according to claim 1, wherein the processing circuitry is configured to execute a threshold value setting process that sets the threshold value that is increased as the viscosity estimated in the viscosity estimation process increases.

6. The controller according to claim 1, wherein the processing circuitry is configured so that the viscosity of the lubricating oil estimated in the viscosity estimation process increases as a traveled distance of the vehicle from when the lubricating oil is changed increases.

7. A method for controlling a vehicle that includes an internal combustion engine, the method comprising:
storing an oil pressure of a lubricating oil for the internal combustion engine as a specified oil pressure when the internal combustion engine satisfies a specific operation condition;
storing an oil temperature of the lubricating oil as a specified oil temperature when the internal combustion engine satisfies the specific operation condition;
estimating a specified viscosity of the lubricating oil based on the specified oil pressure and the specified oil temperature;
correcting the specified viscosity based on a traveled distance of the vehicle from when the lubricating oil is changed;
setting a threshold value based on the specified viscosity that has been corrected;
obtaining a predicted temperature outside the vehicle;
determining that there is a likelihood of a cranking failure occurring in the internal combustion engine when the predicted temperature is less than the set threshold value; and
outputting a notification signal indicating a likelihood of a cranking failure occurring in the internal combustion engine when determined that there is a likelihood of a cranking failure occurring in the internal combustion engine.

* * * * *